United States Patent [19]

Powell et al.

[11] Patent Number: 4,881,315

[45] Date of Patent: Nov. 21, 1989

[54] METHOD OF ASSEMBLING AN ANTI-SWEAT HEATER IN A REFRIGERATOR CABINET

[75] Inventors: John M. Powell, Charlestown, Ind.; Louis D. Bruck, Louisville, Ky.

[73] Assignee: General Electric Company, Louisville, Ky.

[21] Appl. No.: 300,528

[22] Filed: Jan. 18, 1989

[51] Int. Cl.$^4$ .............................................. B23P 11/02
[52] U.S. Cl. ...................................... 29/450; 29/453; 62/277; 312/214; 24/457
[58] Field of Search .................... 29/450, 455; 62/263, 62/277; 312/214, 296

[56] References Cited

U.S. PATENT DOCUMENTS

| | | | |
|---|---|---|---|
| 3,157,306 | 11/1964 | Courson | 220/9 |
| 3,489,477 | 1/1970 | Harder, Jr. | 352/236 |
| 3,572,051 | 3/1971 | Benasutti | 62/277 |
| 3,835,660 | 9/1974 | Franck | 62/277 |
| 4,097,096 | 6/1978 | Kochendorfer | 312/214 |
| 4,118,451 | 10/1978 | Schaus | 264/46.5 |
| 4,474,017 | 10/1984 | Prada | 62/77 |
| 4,735,062 | 4/1988 | Wooley et al. | 62/277 |

Primary Examiner—P. W. Echols
Attorney, Agent, or Firm—Frederick P. Weidner; Radford M. Reams

[57] ABSTRACT

A method of assembling an anti-sweat heater in a refrigerator cabinet having an outer sheet metal shell with side panels and a front face. The front face has a U-shaped portion formed with a groove and first, second and third walls in spaced parallel planes with the third wall bent at a right angle to form a flange having a free terminal edge. An anti-sweat header retainer member is formed from sheet metal and has a body portion, a first end portion having three spaced legs, and a second end portion also having three spaced legs with free terminal ends. The center leg of the second end portion has a depending tang portion and each of the side legs of the second end portion have a reverse bend portion open in the direction of the tang portion of the center leg. The anti-sweat heater is placed near a corner in the outer metal shell and the anti-sweat heater retainer member is inserted into the outer wall and the legs of the first end portion of the retainer member are positioned to grip the flange. The legs of the second end portion are positioned so tht the tang portion of the center leg contacts the anti-sweat heater and urges it into the corner while the reverse bend portion of the side legs are seated in the groove in the second U-shaped portion is spring biased relationship.

7 Claims, 3 Drawing Sheets

METHOD OF ASSEMBLING AN ANTI-SWEAT HEATER IN A REFRIGERATOR CABINET

BACKGROUND OF THE INVENTION

This invention relates to household refrigerators and in particular to the cabinet assembly for a refrigerator having a freezer compartment on top, a fresh food compartment on the bottom, and incorporating an anti-sweat heater.

It is common practice in the manufacture of household refrigerators to incorporate an anti-sweat heater in the front face of the freezer compartment which surrounds the access opening of that compartment and these heaters are either electric resistance heaters or hot liquid loop heaters. The refrigeration system of a household refrigerator includes a compressor, condenser and evaporator wherein refrigerant compressed by the compressor is pumped to the condenser. The condenser cools the gas to form a liquid which subsequently passes through a capillary tube to the evaporator where heat from inside the refrigerator is used to evaporate the liquid in the evaporator and the resultant gas is then returned to the compressor by the suction line. The condenser is an elongated tube that is formed in a serpentine and contains hot refrigerant liquid and a portion of the tube or loop may be used to perform the anti-sweat function in the refrigerator.

It is normal for refrigerators and particularly the freezer compartment of the refrigerators to have some small amount of cold air leakage and/or normal conduction through the gasket sealing the access door to the freezer compartment and that small amount of leakage can cause the front face to be cold. Condensation results around the face of the freezer compartment when warm humid room ambient air comes in contact with the cold surface. The anti-sweat heater is to warm the area around the front face of the freezer compartment so that condensation is minimized.

It has been the usual practice in installing the hot liquid loop in a refrigerator cabinet that it be secured in some manner usually by many metal or plastic clips. The manipulation of the rather long, small diameter tube forming the loop to place it correctly in the cabinet for good heat transfer characteristics is very difficult. This practice results in costly installation and due to the tolerances involved the liquid loop may not be retained tightly against the front face of the freezer compartment for maximum heat transfer.

U.S. Pat. No. 4,735,062 assigned to the same assignee as the present invention describes a cabinet assembly for a refrigerator wherein the hot liquid anti-sweat loop may be assembled with a minimum amount of metal or plastic clips to hold the loop tightly against the corner of the cabinet for maximum heat transfer. This invention relates to such an assembly and a specific clip structure that may be utilized in a minimum amount to assure that the liquid loop is retained tightly against the corner of the refrigerator cabinet for maximum heat transfer.

Another approach which is widely practiced to prevent sweating of the cabinet is the use of electric resistance heaters disposed within the refrigerator cabinet which may be turned on and off as needed to prevent the condensate formation. U.S. Pat. No. 4,474,017 assigned to the same assignee as the present invention describes a method of assembling an anti-sweat heater of the electric resistance type in a refrigerator cabinet. While an electric resistance heating element is relatively simple to incorporate and readily controllable by a manual control switch, electric resistance heating increases the power required to operate the refrigerator. If the heater is not properly located and therefore not in good heat transfer relationship with the cabinet outer surfaces, it is not as effective to prevent condensate on the cabinet. The clip of the present invention may be used to properly locate the electric resistance heater in the corner of the cabinet to effect good heat transfer relationship the same as with the hot liquid loop.

By this invention there is provided a method whereby an anti-sweat heater is secured to a refrigerator cabinet and in good heat transfer relationship.

SUMMARY OF THE INVENTION

According to one aspect of this invention, there is provided a method of assembling an anti-sweat heater in a refrigerator cabinet comprising forming an outer sheet metal shell having side panels and a front face, said front face formed to provide a first U-shaped portion which includes a first outer wall perpendicular to the side panel to form a corner therebetween and a second inner wall spaced from the first outer wall, both walls being connected by the first U-shaped portion, said second inner wall being reversely bent to form a third wall and provide a second U-shaped portion formed between the second inner wall and the third wall and formed to provide a groove along the second U-shaped portion. The first, second and third walls are in spaced parallel planes with the third wall bent at a right angle to form a flange having a free terminal edge.

An anti-sweat heater retainer member is formed from sheet metal and has a body portion, a first end portion having three spaced legs including a center leg and a side leg on each side of the center leg attached to and depending from the body portion. There is a second end portion at the end of the body portion opposite from the first end portion having three spaced legs with free terminal ends and including a center leg and a side leg on each side of the center leg attached to and depending from the body portion in the same direction as the legs of the first end portion with the terminal end of the center leg extending beyond the terminal ends of the side legs. The center leg has a depending tang portion and each of the side legs have a reverse bend portion open in the direction of the tang portion of the center leg.

The anti-sweat heater is placed in the outer metal shell near the corner located between the side panel and the first outer wall. The anti-sweat heater retainer member is inserted into the outer wall and the legs of the first end portion of the retainer member are positioned so that the center leg bears against one side of the flange of the outer metal shell and the two side legs bear against the opposite side of the flange. The legs of the second end portion are positioned so that the tang portion of the center leg contacts the anti-sweat heater and urges it into the corner between the side panel and first outer wall while the reverse bend portion of the side legs are seated in the groove in the second U-shaped portion in spring biased relationship.

DESCRIPTION OF THE PREFERRED EMBODIMENT

The method of assembling an anti-sweat heater in a refrigerator cabinet as described herein and claimed may be either the electric resistance type which has a tube shaped outer wall as described in U.S. Pat. No. 4,474,017 or a secondary hot refrigerant loop type as described in U.S. Pat. No. 4,735,062, both of which are referred to herein as "anti-sweat heater". The preferred embodiment will describe the secondary hot refrigerant loop type.

Figure 1:
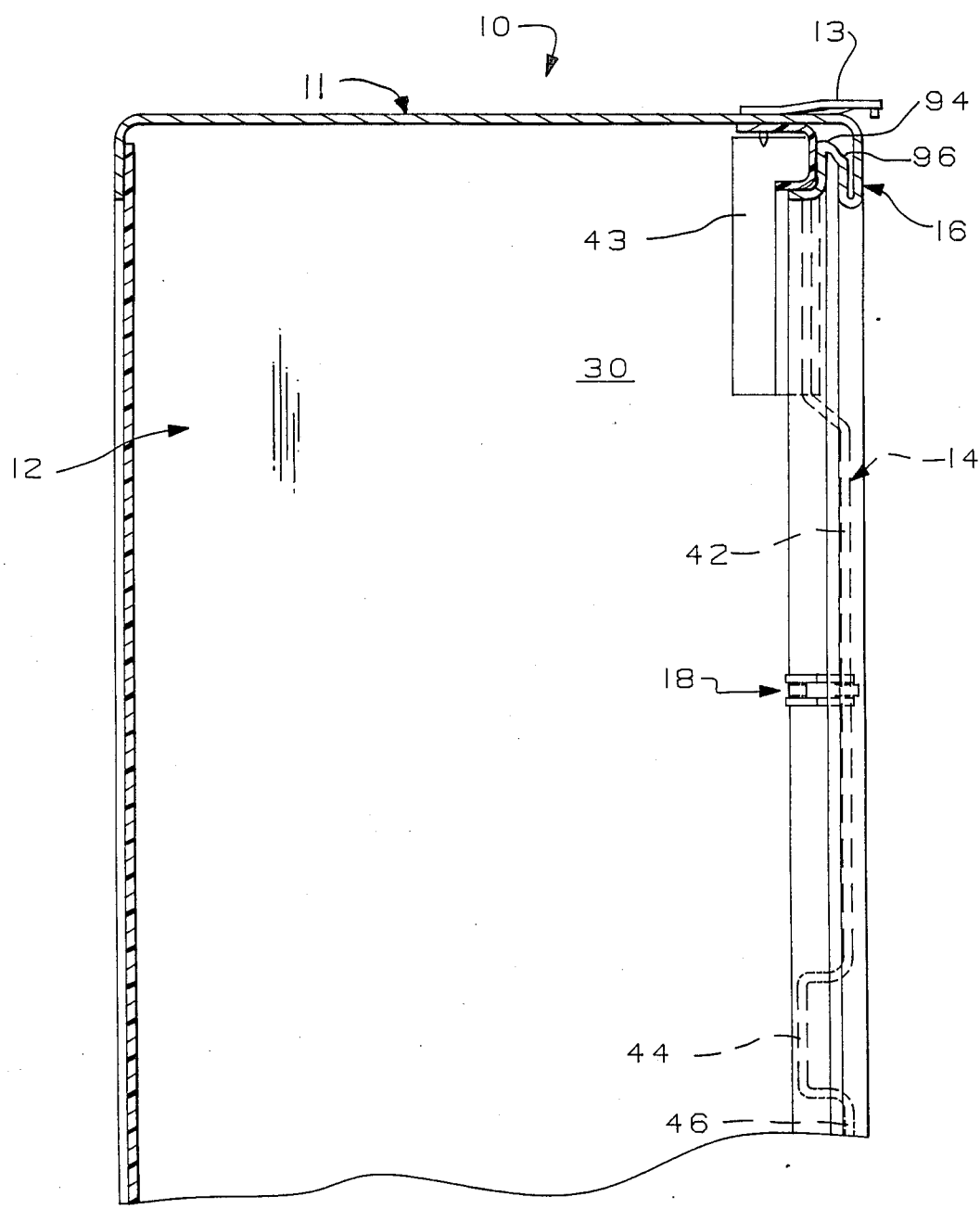
FIG. 1 is a side elevational view in partial cross-section showing the upper portion of a household refrigerator cabinet incorporating the present invention.

With reference to FIG. 1, there is shown part of a household refrigerator 10 having an outer metal shell 11 with a freezer compartment area generally designated as 12 located at the top of the refrigerator. There is usually a fresh food compartment (not shown) located in the bottom portion of the refrigerator with the freezer and fresh food compartments separated by a mullion partition (not shown). The freezer and fresh food compartments have access openings closed by gasketed doors attached to one side of the refrigerator by a hinge member 13. Located below the fresh food compartment is the refrigeration machinery compartment (not shown) which is separated from the fresh food compartment by a partition (not shown). Housed within the machinery compartment is the usual refrigeration components of a compressor, a condenser which is in the form of an elongated tube that is bent and formed in a serpentine pattern commonly used in refrigeration systems. The condenser receives hot refrigerant liquid from the compressor which in turn flows through a capillary tube to the evaporator unit which is usually housed in the back of the freezer compartment and which takes heat from within the refrigerator to boil the refrigerant and then the liquid is passed through a suction line back to the compressor and the cycle continues. There is a hot liquid anti-sweat loop 14 which is used in one form of the present invention to minimize sweating or condensation around the front face 16 of the freezer compartment area 12. The sweating can occur due to normal conduction and/or leakage or cold air from within the freezer compartment which causes the front face 16 to be cold and the warmer humid room ambient air that comes in contact with the cold surface or front face 16 condenses. The hot liquid loop 14 is utilized to warm the front face 16 to minimize the condensation that would normally take place.

Figure 2:
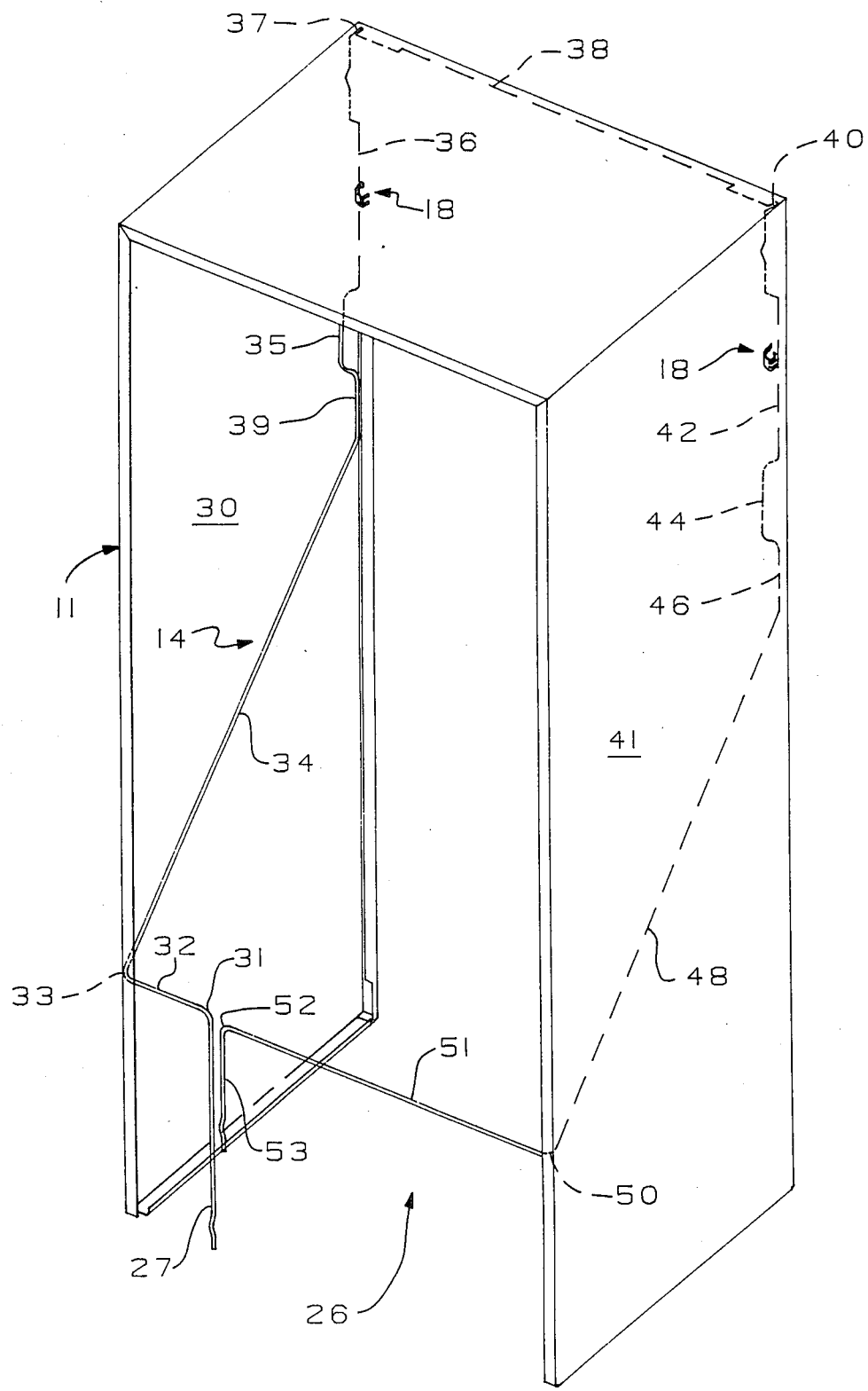
FIG. 2 is a perspective view of the shape of the anti-sweat hot liquid loop located in a refrigerator outer metal shell during assembly and the location of the retainer member used in the assembly of the present invention.
Figure 4:
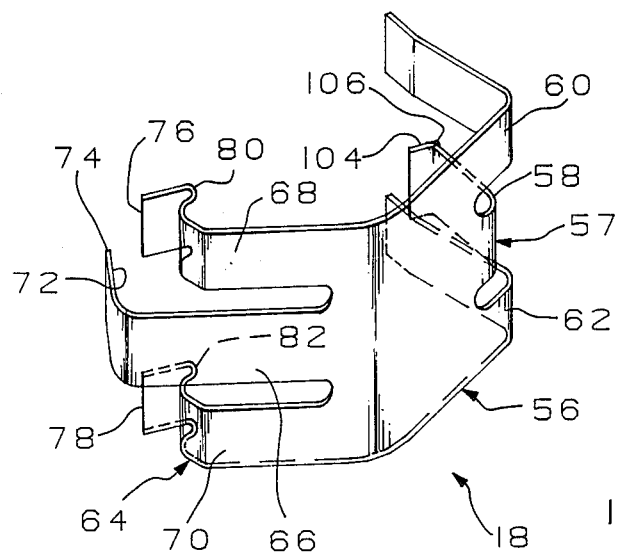
FIG. 4 is a perspective view of the retainer member used in the assembly of the present invention.

As can be seen particularly in FIG. 2, the hot liquid loop 14 exits the machinery compartment area (generally shown as 26) at the bottom rear of the refrigerator cabinet. The hot liquid loop 14 has a vertical straight section 27 exiting what would be the machinery compartment, then a right angle bend 31 and a straight section 32 that extends over to the side panel 30 of the outer shell 11 where it makes a right angle bend 33. The hot liquid loop 14 has an inclined section 34 between the right angle bend 33 and the front face 16 of the cabinet just below where the mullion partition would be, then a short vertical section 39. In the area of where the mullion partition would be in final assembly the loop 26 has an inwardly directed U-shaped bend 35, then a straight section 36 which then reaches a right angle bend 37 which is to fit in one corner brace 43 (FIG. 1) reinforcing the top front corner of the refrigerator and then along the top of the refrigerator by straight section 38 to another right angle bend 40 which is to fit into another corner brace for the other top front corner. The hot liquid loop 14 continues down along the opposite side panel 41 of the refrigerator with a straight section 42, then another inwardly directed U-shaped end 44 in the area of the mullion partition (not shown), then a short vertical section 46 and a rearwardly directed straight inclined section 48 which has a reverse bend 50 and a horizontal straight section 51 to a right angle bend 52 and a vertical straight section 53 that passes into what would be the machinery compartment area 26.

The cabinet assembly shown and disclosed in U.S. Pat. No. 4,735,062 has an arrangement such that the hot liquid anti-sweat loop which is the same as described above may be installed in the refrigerator cabinet with a minimum amount of clips or other securing means, thus reducing the cost to manufacture and labor involved in securing the hot liquid loop to the outer metal shell 11. It was also disclosed that clips or other securing means may only be needed to keep some of the long sections of the hot liquid loop from bowing away from the corners of the front face which would otherwise detrimentally affect heat transfer from the loop 14 to the front face 16. It has been found desirable to add an anti-sweat heater retainer member 18 to straight sections 36 and 42 of the loop. The following is a description of the anti-sweat heater retainer member 18.

The retainer member 18 is made from sheet metal and in particular it may be stamped and formed from thin spring steel and has a body portion 56, a first end portion 57 having three spaced legs including a center leg 58 and two side legs 60 and 62, one on each side of the center leg with all three legs being attached to and depending from the body portion 56. There is a second end portion 64 at the end of the body portion 56 opposite from the first end portion 57 having three spaced legs including a center leg 66 and two side legs 68 and 70, one on each side of the center leg 66, with all three being attached to and depending from the body portion 56 in the same direction as the legs 58, 60 and 62 of the first end portion 57. The center leg 66 has a depending tang portion 72 with a terminal end 74 extending beyond the terminal ends 76 and 78 of side legs 68 and 70 respectively. Each of these side legs have respectively a reverse bend portion 80 and 82 which are open in the direction of the tang portion 72 of the center leg 66.

Figure 3:
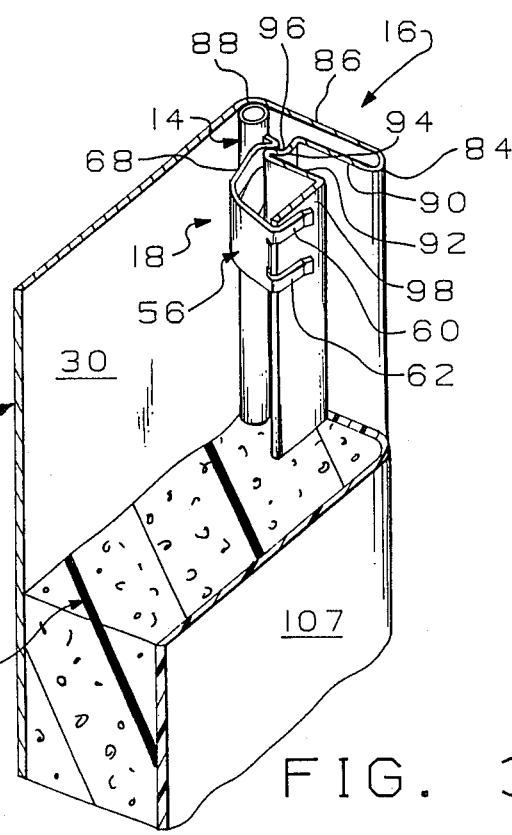
FIG. 3 is a perspective view partly in cross-section showing the final assembly of the present invention.
Figure 6:
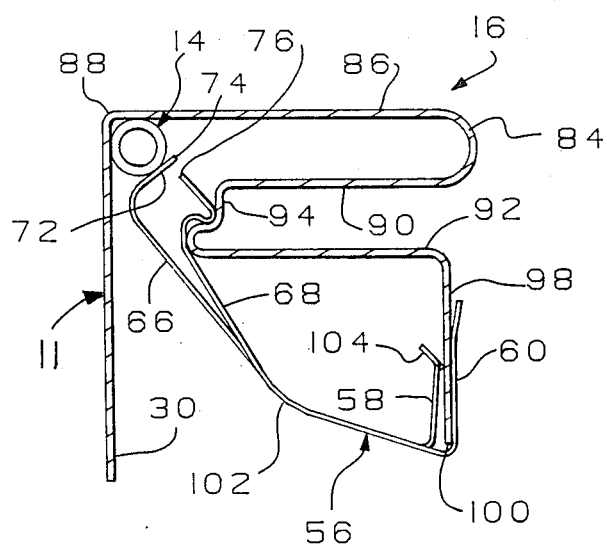
FIG. 6 is a top plan view in section showing a portion of a refrigerator outer metal shell with the final assembly of the present invention.
Figure 5:
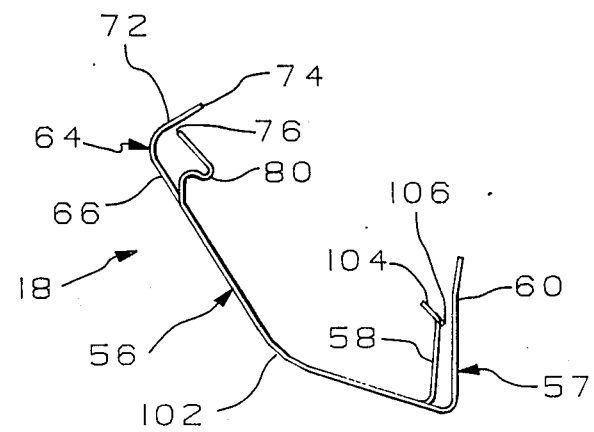
FIG. 5 is a side elevational view showing the retainer member of the assembly of the present invention.

The refrigerator cabinet into which the anti-sweat hot liquid loop 14 is to be installed has an outer sheet metal shell 11 with a front face 16 as shown particularly in FIGS. 3 and 6 which extends across the top of the refrigerator and down along the sides of the freezer area 12. The front face 16 is formed to provide a first U-shaped portion 84 which includes a first outer wall 86 perpendicular to the side panel 30 to form a corner 88 therebetween and a second inner wall 90 which is reversely bent to form a third wall 92 to provide a second U-shaped portion 94 formed between the second inner wall 90 and the third wall 92 and further formed to provide a groove 96 along the second U-shaped portion 94. The first, second and third walls 86, 90 and 92 respectively are in spaced parallel planes and the third wall 92 is bent at a right angle to form a flange 98 having a free terminal edge 100.

With the structure of the outer metal shell 11 and the anti-sweat heater retainer member 18 the anti-sweat hot liquid loop 14 is assembled in the refrigerator by placing it in the outer metal shell 11 near the corner 88 located between the side panel 30 and the first outer wall 86. The anti-sweat retainer member 18 is inserted into the outer metal shell and the legs of the first end portion 57 are positioned so that the center leg 58 bears against one side of the flange 98 of the outer metal shell and the two side legs 60 and 62 bear against the opposite side of the flanges 98.

The anti-sweat heater retainer member 18 is further positioned by placing the legs of the second end portion 64 such that the tang portion 72 of the center leg 66 contacts the anti-sweat hot liquid loop 14 and urges it into the corner 88 between the side panel 30 and first outer wall 86 as particularly shown in FIGS. 3 and 6. At the same time the reverse bend portions 80 and 82 of side legs 68 and 70 respectively are seated in the groove 96 in the second U-shaped portion 94 in spring biased relationship. The final assembled structure of the outer sheet metal shell 11, the anti-sweat hot liquid loop 14 and the anti-sweat heater retainer member 18 is shown in FIG. 6.

To enhance the retaining characteristics of the heater retainer member 18, the body portion 56 has formed therein a bend 102 that provides biasing force between the first end portion 57 and second end portion 64 when the retainer member 18 is in its final position on the outer metal shell 11 as shown in FIG. 6. In addition, the center leg 58 of the first end portion 57 is bent in a direction toward the body portion 56 to provide a sloping section 104 which helps guide the first end portion onto the flange 98. To retain the first end portion there also may be provided barb elements 106 that will engage the flange 98 when the center leg 58 bears against the flange. These barbs will dig into the flange and prevent easy or accidental removal of the first end portion of the retainer member from the flange 98.

After the anti-sweat hot liquid loop 14 is installed in the refrigerator cabinet as described above, a liner 107 usually made of plastic is inserted into the outer metal shell and secured by suitable means to the front face 16 in spaced relationship with the outer metal shell 11. The space is subsequently insulated usually by the introduction of a foamed resin to provide thermal insulation 108 of the refrigerator cabinet.

As mentioned before the method of assembling an anti-sweat heater in a refrigerator cabinet in accordance with this invention includes both the hot liquid loop type as described in the preferred embodiment above and also the electric resistance heating element type as both are of similar shape and function the same and both need to be located in the corners of the cabinet outer metal shell for good heat transfer relationship therewith.

The foregoing is a description of the preferred method of assembling an anti-sweat heater in a refrigerator cabinet and it should be understood that variations may be made thereto without departing from the true spirit of the invention, as defined in the appended claims.

What is claimed is:

1. A method of assembling an anti-sweat heater in a refrigerator cabinet comprising:

forming an outer sheet metal shell having side panels and a front face, said front face formed to provide a first U-shaped portion which includes a first outer wall perpendicular to the side panel to form a corner therebetween and a second inner wall spaced from the first outer wall, both walls being connected by the first U-shaped portion, said second inner wall being reversely bent to form a third wall and provide a second U-shaped portion formed between the second inner wall and the third wall and formed to provide a groove along the second U-shaped portion, said first, second and third walls being in spaced parallel planes with the third wall bent at a right angle to form a flange having a free terminal edge, forming an anti-sweat heater retainer member from sheet metal having,
a body portion,
a first end portion having three spaced legs including a center leg and a side leg on each side of the center leg attached to and depending from the body portion,
a second end portion at the end of the body portion opposite from the first end portion having three spaced legs with free terminal ends and including a center leg and a side leg on each side of the center leg attached to and depending from the body portion in the same direction as the legs of the first end portion and having a depending tang portion with the terminal end of the center leg extending beyond the terminal ends of the side legs and each of the side legs having a reverse bend portion open in the direction of the tang portion of the center leg, placing the anti-sweat heater in the outer metal shell near the corner located between the side panel and first outer wall, inserting the anti-sweat heater retainer member into the outer metal shell, positioning the legs of the first end portion of the retainer member so that the center leg bears against one side of the flange of the outer metal shell and the two side legs bear against the opposite side of said flange, and positioning the legs of the second end portion so that the tang portion of the center leg contacts the anti-sweat heater and urges it into the corner between the side panel and first outer wall while the reverse bend portion of the side legs are seated in the groove in the second U-shaped portion in spring biased relationship.

2. The method of assembling an anti-sweat heater in a refrigerator cabinet of claim 1 wherein the center leg of the first end portion of the retainer member has at least one barb element that engages the flange when the center leg bears against the flange.

3. The method of assembling an anti-sweat heater in a refrigerator cabinet of claim 1 wherein the center leg of the first end portion of the retainer member is shorter than the side legs.

4. The method of assembling an anti-sweat heater in a refrigerator cabinet of claim 1 wherein the retainer member is formed of thin spring steel.

5. The method of assembling an anti-sweat heater in a refrigerator cabinet of claim 1 wherein the body portion of the retainer member is formed with a bend that provides biasing force between the first end portion and second end portion when the retainer member is in its final position on the outer metal shell.

6. The method of assembling an anti-sweat heater in a refrigerator cabinet of claim 1 wherein the heater is a refrigerant hot liquid condenser loop.

7. The method of assembling an anti-sweat heater in a refrigerator cabinet of claim 1 wherein the heater is an electric resistance heating element.

* * * * *